US012772101B2

(12) United States Patent
Guo et al.

(10) Patent No.: US 12,772,101 B2
(45) Date of Patent: Oct. 20, 2026

(54) DATA TRANSMISSION METHOD, APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Yali Guo, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 304 days.

(21) Appl. No.: 18/398,641

(22) Filed: Dec. 28, 2023

(65) Prior Publication Data

US 2024/0129791 A1 Apr. 18, 2024

Related U.S. Application Data

(63) Continuation of application No. PCT/CN2021/110666, filed on Aug. 4, 2021.

(51) Int. Cl.
*H04W 28/06* (2009.01)
*H04W 28/02* (2009.01)

(52) U.S. Cl.
CPC .................. *H04W 28/0273* (2013.01); *H04W 28/0268* (2013.01); *H04W 28/06* (2013.01)

(58) Field of Classification Search
CPC ................. H04W 76/15; H04W 28/10; H04W 28/0263; H04W 80/08; H04W 36/0011; H04W 76/34; H04W 28/16; H04W 72/23; H04W 76/27; H04W 80/02
See application file for complete search history.

(56) References Cited

U.S. PATENT DOCUMENTS

| | | | |
|---|---|---|---|
| 2018/0191628 | A1 | 7/2018 | Francini et al. |
| 2019/0116518 | A1 | 4/2019 | Stojanovski et al. |
| 2020/0404538 | A1 | 12/2020 | Zhu et al. |

FOREIGN PATENT DOCUMENTS

| | | | | |
|---|---|---|---|---|
| CN | 108632308 | A | 10/2018 | |
| CN | 110691370 | A | 1/2020 | |
| EP | 3624500 | A1 * | 3/2020 | ........ H04W 28/0268 |
| WO | WO-2018206855 | A1 * | 11/2018 | ............ H04W 76/15 |
| WO | 2020257107 | A1 | 12/2020 | |
| WO | WO-2020248709 | A1 * | 12/2020 | ............. H04L 67/30 |

OTHER PUBLICATIONS

WO 2020/248709 A1 English translation (Year: 2020).*
(Continued)

*Primary Examiner* — Gary Lafontant
(74) *Attorney, Agent, or Firm* — Sheppard, Mullin, Richter & Hampton LLP

(57) ABSTRACT

The present disclosure relates to mobile communication technology, and provides a data transmission method, an apparatus, a device, and a storage medium. The method includes: receiving control indication information transmitted by a session management network element. The control indication information instructs the terminal device to perform transmission control on a service data flow at an application data unit level.

17 Claims, 9 Drawing Sheets

(56) References Cited

OTHER PUBLICATIONS

Communication pursuant to Article 94(3) EPC of European application No. 21952259.6 issued on Apr. 11, 2025.
International Search Report and Written Opinion dated Apr. 28, 2022 in International Application No. PCT/CN2021/110666. English translation attached.
"3rd Generation Partnership Project; Technical Specification Group Services and System Aspects; System architecture for the 5G System (5GS); Stage 2(Release 16)"3GPP TS 23.501 V16.7.0,Dec. 2020, Clause 5.7.
Qualcomm Incorporated, "S2-2104661 New SID: Further enhancements for XR services" 3GPP TSG-SA WG2 Meeting #145E , May 2021, Electronic meeting, p. 3-4.
Qualcomm Incorporated,"New SID on further enhancements for XR services" 3GPP TSG-SA WG2#145E e-meeting S2-2104662, May 2021.
Qualcomm Inc. "Potential Enhancements for XR" 3GPP TSG RAN WG1#105-e R1-2104704, May 27, 2021 (May 27, 2021), section 3.4.
Huawei et al. "Challenges and potential enhancements for XR and Cloud Gaming"3GPP TSG RAN WG1 Meeting #104bis-e,R1-2103390,E-meeting,Apr. 12, 2021.
Qualcomm Incorporated, "[FS_XRTraffic] SA4 and RAN1 Collaboration Proposal"3GPP TSG SA WG4 #113e, S4-210612,E-meeting,Apr. 6, 2021.
Vivo, "Challenges and potential enhancements of XR"3GPP TSG RAN WG1 #104-e, R1-2100479,e- Meeting,Jan. 25, 2021.
3GPP TS 23.503 V16.9.0 3rd Generation Partnership Project; Technical Specification Group Services and System Aspects; Policy and charging control framework for the 5G System (5GS); Stage 2(Release 16).
Ericsson, "Discussion on enhancements for XR"3GPP TSG-RAN WG1 Meeting #105e Tdoc R1-2105832, Online, May 10, 2021.
Extended European search report of counterpart European application No. 21952259.6 issued on Jun. 20, 2024.
Communication pursuant to Article 94(3) EPC of counterpart European application No. 21952259.6 issued on Oct. 31, 2025.
3GPP Ts 29.281 V17.0.0 (Mar, 2021), 3rd Generation Partnership Project; Technical Specification Group Core Network and Terminals; General Packet Radio System (GPRS) Tunnelling Protocol User Plane (GTPv1-U) (Release 17), 29281-h00, Mar. 2021, entire document.

* cited by examiner

DATA TRANSMISSION METHOD, APPARATUS, DEVICE, AND STORAGE MEDIUM

CROSS-REFERENCE TO RELATED APPLICATIONS

The application is a continuation of International Application No. PCT/CN2021/110666 filed on Aug. 4, 2021, the entire content of which is incorporated herein by reference.

TECHNICAL FIELD

The present disclosure relates to mobile communication technology, and more particularly, to a data transmission method, an apparatus, a device, and a storage medium.

BACKGROUND

In the New Radio (NR) system, a set of data packets constitute an application data unit. During a transmission process of data packets between a terminal device and a network device, if any transmitted data packet is lost, even if other data packets in the application data unit to which the data packet belongs are successfully transmitted, these data packets cannot constitute the application data unit, resulting in a waste of transmission resources.

SUMMARY

The embodiments of the present disclosure provide a data transmission method, an apparatus, a device, and a storage medium. In a transmission process, data packets are transmitted in units of application data units. The technical solutions are as follows.

According to an aspect of the present disclosure, a data transmission method is provided. The method is applied in a terminal device and includes:

receiving control indication information transmitted by a session management network element.

Here, the control indication information instructs the terminal device to perform transmission control on a service data flow at an application data unit level.

According to an aspect of the present disclosure, a data transmission method is provided. The method is applied in an access network device and includes:

receiving control indication information transmitted by a session management network element.

Here, the control indication information instructs the access network device to perform transmission control at an application data unit level.

According to an aspect of the present disclosure, a data transmission method is provided. The method is applied in a user plane network element and includes:

receiving control indication information transmitted by a session management network element, the control indication information instructing a user plane network element to add application data unit information to header information of a downlink data packet in a service data flow.

According to an aspect of the present disclosure, a terminal device is provided. The terminal device includes: a processor; a transceiver coupled to the processor; and a memory storing program codes executable by the processor. The processor is configured to load and execute the executable program codes to implement the data transmission method as described in the above aspect.

According to an aspect of the present disclosure, an access network device is provided. The access network device includes: a processor; a transceiver coupled to the processor; and a memory storing program codes executable by the processor. The processor is configured to load and execute the executable program codes to implement the data transmission method as described in the above aspect.

According to an aspect of the present disclosure, a user plane network element is provided. The user plane network element includes: a processor; a transceiver coupled to the processor; and a memory storing program codes executable by the processor. The processor is configured to load and execute the executable program codes to implement the data transmission method as described in the above aspect.

BRIEF DESCRIPTION OF DRAWINGS

In order to illustrate the technical solutions in the embodiments of the present disclosure more clearly, the figures needed to be used in the description of the embodiments will be briefly introduced below. Obviously, the figures in the following description are only some embodiments of the present disclosure. For those of ordinary skill in the art, other figures can also be obtained based on these drawings without inventive efforts.

DESCRIPTION OF EMBODIMENTS

The embodiments of the present disclosure will be further described in detail below with reference to the accompanying drawings, such that the objects, technical solutions, and advantages of the present disclosure will become more apparent.

First, a communication system of the present disclosure is explained.

Figure 1:
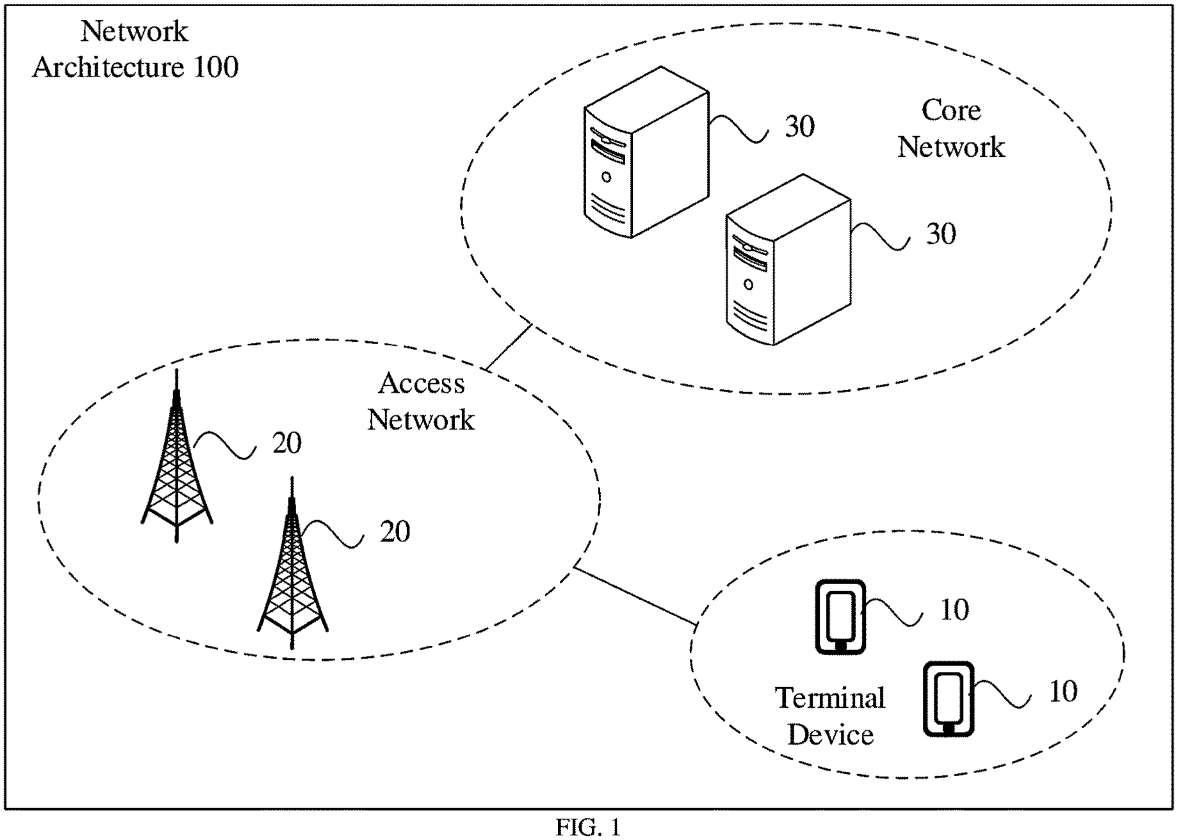
FIG. 1 is a block diagram of a communication system according to an exemplary embodiment of the present disclosure.

FIG. 1 shows a block diagram of a communication system according to an exemplary embodiment of the present disclosure. The communication system may include: a terminal device 10, an access network device 20, and a core network device 30.

The terminal device 10 may refer to a User Equipment (UE), an access terminal device, a user unit, a user station, a mobile station, a mobile, a remote station, a remote terminal device, a mobile device, a wireless communication device, a user agent or a user device. Optionally, the terminal device 10 may also be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a $5^{th}$ Generation System (5GS) or a terminal device in a future evolved Public Land Mobile Network (PLMN), etc. The embodiment of the present disclosure is not limited to any of these examples. For convenience of description, the devices mentioned above are collectively referred to as terminal devices. There may be typically a plurality of terminal devices 10, and one or more terminal devices 10 may be distributed in a cell managed by each access network device 20.

The access network device 20 is a device deployed in an access network to provide wireless communication functions for the terminal devices 10. The access network device 20 may include various forms of macro base stations, micro base stations, relay stations, access points, etc. In systems using different radio access technologies, the names of devices with access network device functions may be different. For example, in 5G NR systems, they are called gNodeB or gNB. As communication technology evolves, the name "access network device" may change. For convenience of description, in the embodiment of the present disclosure, the above devices that provide wireless communication functions for the terminal devices 10 are collectively referred to as access network devices. Optionally, through the access network device 20, a communication relationship can be established between the terminal device 10 and the core network device 30. For example, in a Long Term Evolution (LTE) system, the access network device 20 may be an Evolved Universal Terrestrial Radio Access Network (EUTRAN) or one or more eNodeBs in the EUTRAN. In the 5G NR system, the access network device 20 may be a Radio Access Network (RAN) or one or more gNBs in the RAN. Unless otherwise specified, the network device in the embodiment of the present disclosure refers to the access network device 20, such as a base station.

The core network device 30 is a device deployed in a core network. The core network device 30 main functions are to provide user connections, manage users, and carry services, as a bearer network interfacing external networks. The core network device 30 includes core network elements with various management functions. For example, the core network elements include an Access and Mobility Management Function (AMF) network element, a Session Management Function (SMF) network element, a Policy Control Function (PCF) network element, a User Plane Function (UPF) network element, a Network Slice Selection Function (NSSF) network element, an Authentication Server Function (AUSF) network element, a Unified Data Management (UDM) network element, an Application Function (AF) network element, etc.

Figure 2:
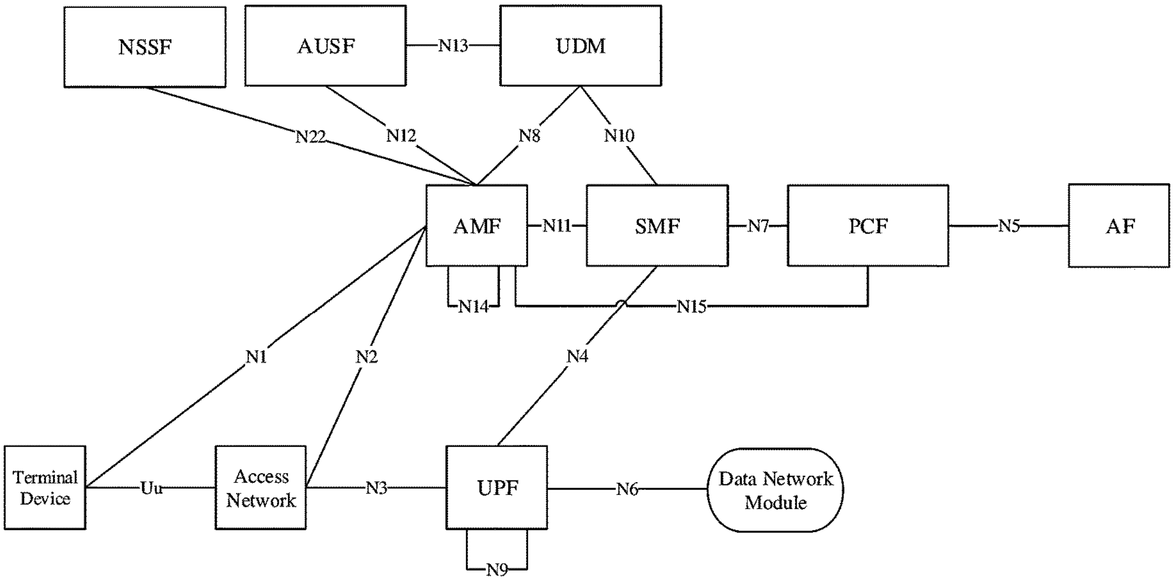
FIG. 2 is a schematic diagram showing an architecture of a 5G communication network system according to an exemplary embodiment of the present disclosure.

In some embodiments, the access network device 20, the terminal device 10 and the core network device 30 in the present disclosure are applied in a 5G communication network. For example, FIG. 2 shows an architecture of the 5G communication network system. The terminal device establishes an access stratum connection with the access network device 20 via a Uu interface (a communication interface) and exchanges access stratum messages and wireless data transmissions. The terminal device 10 performs a non-access stratum connection with the AMF via an N1 interface and exchanges non-access stratum messages. The AMF is the mobility management function in the core network, and the SMF is the session management function in the core network. In addition to mobility management of the terminal device 10, the AMF is also responsible for forwarding session management related messages between the terminal device 10 and the SMF. The PCF is the policy management function in the core network and is responsible for formulating policies related to mobility management, session management, and billing of terminal devices. The UPF is the user plane function in the core network, and transmits data with external data networks via an N6 interface and with the access stratum via an N3 interface.

In one example, the access network device 20 and the core network device 30 communicate with each other using some air interface technology, such as an NG interface in the 5G NR system. The access network device 20 and the terminal device 10 communicate with each other via some air interface technology, such as the Uu interface.

The "5G NR system" in the embodiment of the present disclosure may also be called a 5G system or an NR system, but those skilled in the art can understand its meaning. The technical solutions described in the embodiments of the present disclosure can be applied to the LTE system, the 5G NR system, subsequent evolved systems of the 5G NR system, and can be applied to e.g., the Narrow Band Internet of Things (NB-IoT) systems and other communication systems. The present disclosure is not limited to this.

The network architecture and service scenario described in the embodiments of the present disclosure are provided for illustrating the technical solutions of the embodiments of the present disclosure more clearly, and do not constitute limitations on the technical solutions according to the embodiments of the present disclosure. Those skilled in the art know that with the evolution of the technology and the emergence of new service scenarios, the technical solutions provided in the embodiments of the present disclosure are also applicable to similar technical problems.

Figure 3:
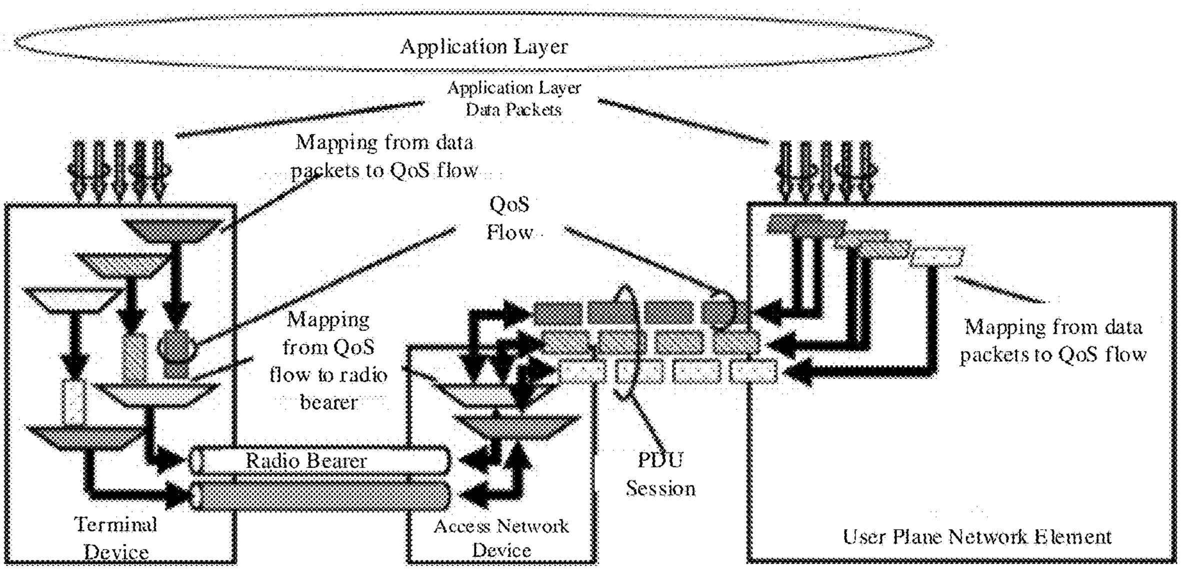
FIG. 3 is a schematic diagram showing a QoS model of a 5G communication network according to an exemplary embodiment of the present disclosure.

In the present disclosure, Quality of Service (QoS) control of the 5G communication network is controlled based on QoS flows. FIG. 3 is a schematic diagram showing a QoS model of the 5G communication network according to an exemplary embodiment of the present disclosure. Referring to FIG. 3, a terminal device accesses a 5G communication network via a Uu interface and establishes a QoS flow for data transmission under the control of an SMF, and the SMF configures QoS configuration information of each QoS flow for an access network device.

Here, the QoS configuration information includes a 5G QoS Identifier (5QI), an Allocation and Retention Priority (ARP), and a bit rate requirement. The 5QI is an index value used to indicate QoS features such as a delay requirement, a bit error rate requirement, etc., and the ARP allocates or retains a priority of resources for the QoS flow for the access network device. For each QoS flow, the access network device schedules radio resources to perform QoS control on the QoS flow according to the QoS flow configuration information received from the SMF.

Figure 4:
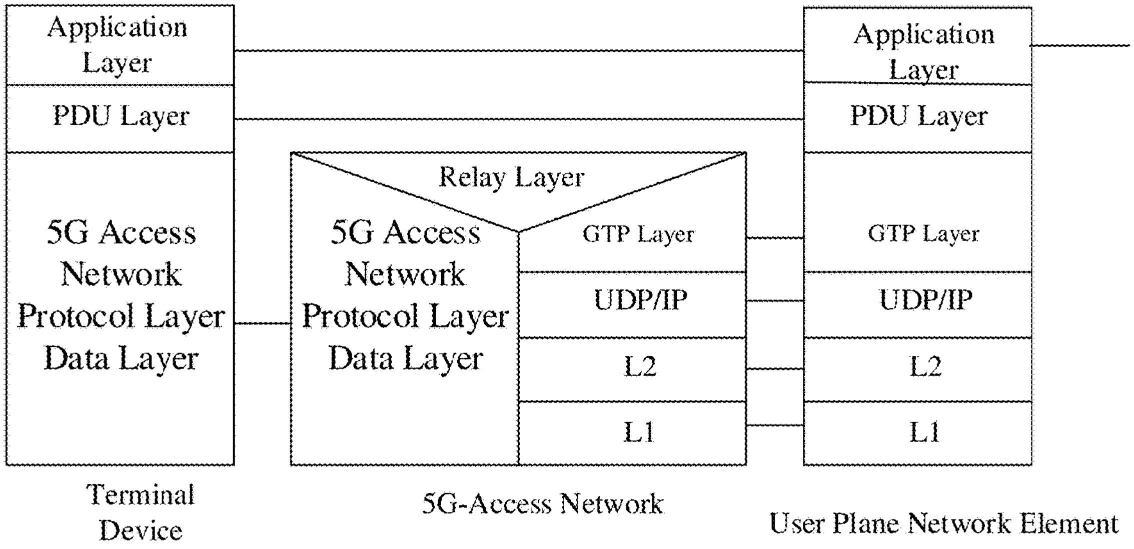
FIG. 4 shows a user plane protocol stack according to an exemplary embodiment of the present disclosure.

Next, the user plane protocol stack involved in the present disclosure will be described. FIG. 4 shows a user plane protocol stack according to an exemplary embodiment of the present disclosure.

In the embodiment of the present disclosure, the user plane network element is connected with application layer data and protocol data unit layer data of a terminal device. That is, the user plane network element can identify the application layer data and protocol data unit layer data in data packets. The 5G access network is connected with 5G access network protocol layer data of the terminal device. That is, the 5G access network can identify the 5G access network protocol layer data in data packets. Moreover, the 5G access network is connected with L1 (a link layer) layer, L2 (a link layer) layer, Internet Protocol (IP) layer and GPRS Tunneling Protocol (GTP) layer data of the user plane network element. That is, the 5G access network can identify the L1 layer, L2 layer, IP layer and GTP layer data in data packets.

Figure 5:
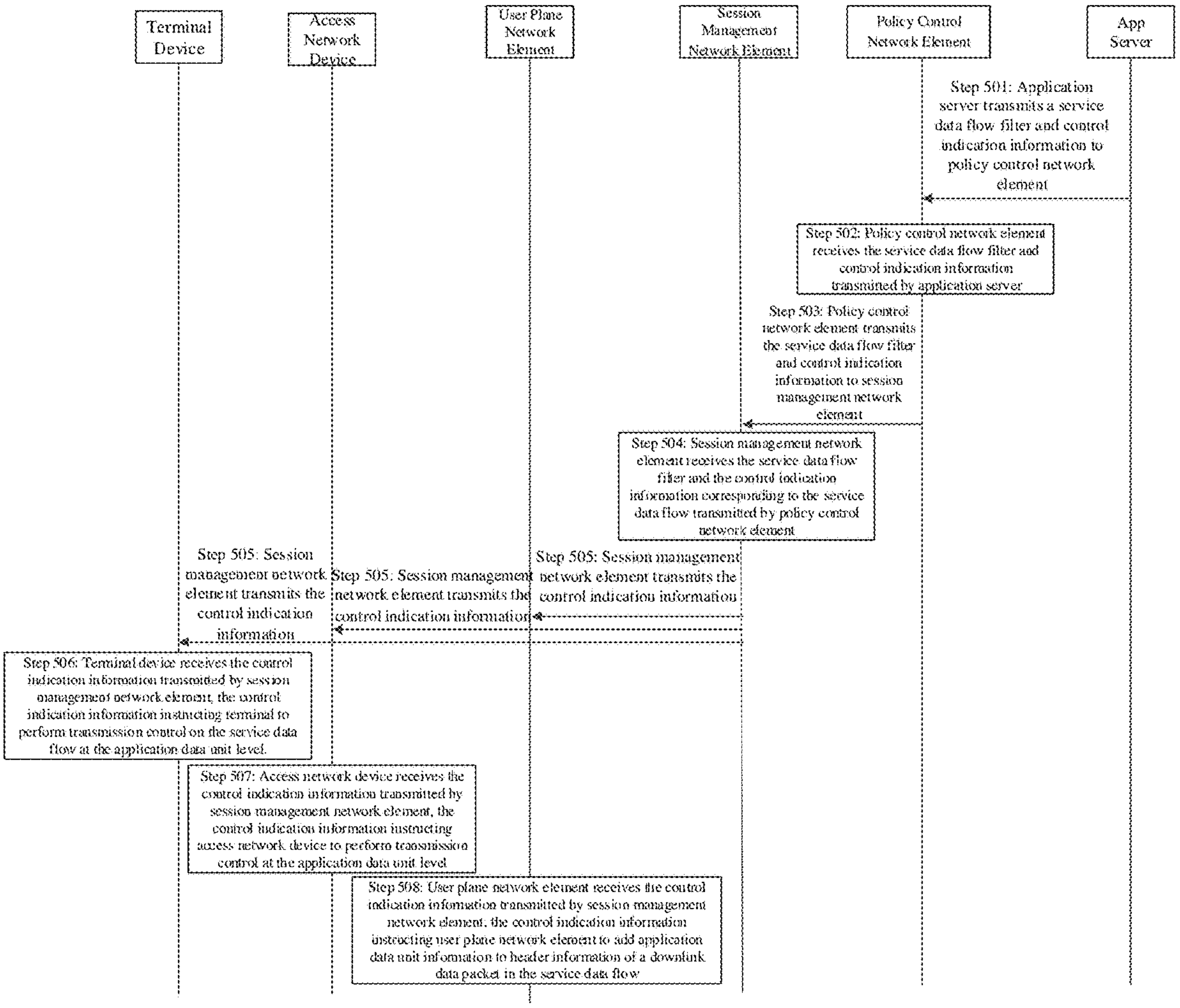
FIG. 5 is a flowchart illustrating a data transmission method according to an exemplary embodiment of the present disclosure.

FIG. 5 is a flowchart illustrating a data transmission method according to an exemplary embodiment of the present disclosure. The method includes at least part of the following content.

At Step 501, an application server transmits a service data flow filter and control indication information to a policy control network element.

Here, the service data flow filter is used to match a service data flow. The control indication information instructs to perform transmission control on the service data flow at an application data unit level.

In some embodiments, the transmission control on the service data flow at the application data unit level means that, for each application data unit in the service data flow, a plurality of data packets included in the application data unit are continuously transmitted, and if any one of the plurality of data packets is lost, other data packets in the application data unit should be discarded and should not be transmitted.

In other embodiments, the transmission control on the service data flow at the application data unit level means that, if data packets of an application data unit cannot be transmitted, then data packets included in other application data units associated with the application data unit are discarded and not transmitted.

It should be noted that the embodiments of the present disclosure only illustrate transmission control at the application data unit level by way of example. The embodiments of the present disclosure are not limited to the transmission control at the application data unit level, and other schemes can be used to perform the transmission control at the application data unit level.

In an embodiment of the present disclosure, the application server provides control plane information for the policy control network element in a core network device. For example, the control plane information may include at least one of the control indication information, the service data flow filter, or a QoS requirement.

In some embodiments, the application server is a third-party server. For example, the application server may be an instant communication server, or the application server may be a video server, or the application server may be another type of servers, and the embodiment of the present disclosure is not limited to this.

Optionally, the service data flow may include a plurality of application data units, each including a plurality of data packets associated with each other. If any of the plurality of data packets is lost, other data packets in the application data unit cannot constitute the application data unit.

In some embodiments, the application data flow is a video data stream, and each application data unit in the video data stream indicates a video frame in the video data stream, or a coded segment in a video frame.

For example, if each application data unit indicates a coded segment in a video in the video data stream, then a plurality of application data units constitute one video frame in the video data stream.

In some embodiments, the service data flow filter includes IP 5-tuple information. Here, the IP 5-tuple information includes a source IP address, a source port, a destination IP address, a destination port, and a transport layer protocol.

At Step 502, the policy control network element receives the service data flow filter and control indication information transmitted by the application server.

In an embodiment of the present disclosure, the application server transmits the service data flow filter and control indication information to the policy control network element. After receiving the service data flow filter and control indication information, the policy control network element can determine to perform transmission control on the service data flow at the application data unit level.

At Step 503, the policy control network element transmits the service data flow filter and control indication information to a session management network element.

At Step 504, the session management network element receives the service data flow filter and the control indication information corresponding to the service data flow transmitted by the policy control network element.

In an embodiment of the present disclosure, the policy control network element transmits the service data flow filter and control indication information to the session management network element, and then the session management network element can determine to perform transmission control on the service data flow at the application data unit level.

At Step 505, the session management network element transmits the control indication information.

After the session management network element receives the service data flow filter and control indication information transmitted by the policy control network element, the session management network element transmits the control indication information to an access network device, a terminal device and a user plane network element to complete configuration of the access network device, the terminal device and the user plane network element.

At Step 506, the terminal device receives the control indication information transmitted by the session management network element, and the control indication information instructs the terminal to perform transmission control on the service data flow at the application data unit level.

In an embodiment of the present disclosure, if the terminal device receives the control indication information transmitted by the session management network element, the terminal device determines that it is necessary to perform transmission control on the service data flow at the application data unit level.

After the terminal device receives the control indication information transmitted by the session management network element, the terminal device completes the configuration. When the terminal device subsequently needs to request for transmitting an uplink service data flow, it transmits request information including application data unit information to the access network device for requesting resources.

At Step 507, the access network device receives the control indication information transmitted by the session management network element, and the control indication information instructs the access network device to perform transmission control at the application data unit level.

In an embodiment of the present disclosure, if the access network device receives the control indication information transmitted by the session management network element, the access network device determines that the transmission control at the application data unit level is required.

After the access network device receives the control indication information transmitted by the session management network element, the access network device completes the configuration. Subsequently, the access network device schedules resources for transmission in units of application data units, thereby ensuring transmission control at the application data units.

At Step 508, the user plane network element receives the control indication information transmitted by the session management network element, and the control indication information instructs the user plane network element to add application data unit information to header information of a downlink data packet in the service data flow.

In an embodiment of the present disclosure, if the user plane network element receives the control indication information transmitted by the session management network element, the user plane network element completes the configuration. Subsequently, the user plane network element adds the application data unit information to the header information of the downlink data packet, which enables the access network device to identify the header information of the downlink data packet and then perform transmission control at the application data unit level.

First, it is to be noted that the embodiment of the present disclosure is not limited to any specific order in which the steps 506-508 are performed.

Second, it is to be noted that in the embodiment of the present disclosure, the steps 501-508 are performed as an example for explanation only. In an embodiment of the present disclosure, the steps of each device can be performed independently, and the present disclosure is not limited to performing the above steps 501-508 in sequence.

In the data transmission method according to the embodiment of the present disclosure, after the terminal device, access network device and user plane network element all receive the control indication information, the terminal device and the access network device both determine that transmission control at the application data unit level is required, and the user plane network element also needs to add application data unit information to the header information of the downlink data packet for identification by the access network device, such that in a transmission process, data packets can be transmitted in units of application data units, so as to avoid cases where application data units cannot be constituted, thereby saving transmission resources.

Figure 6:
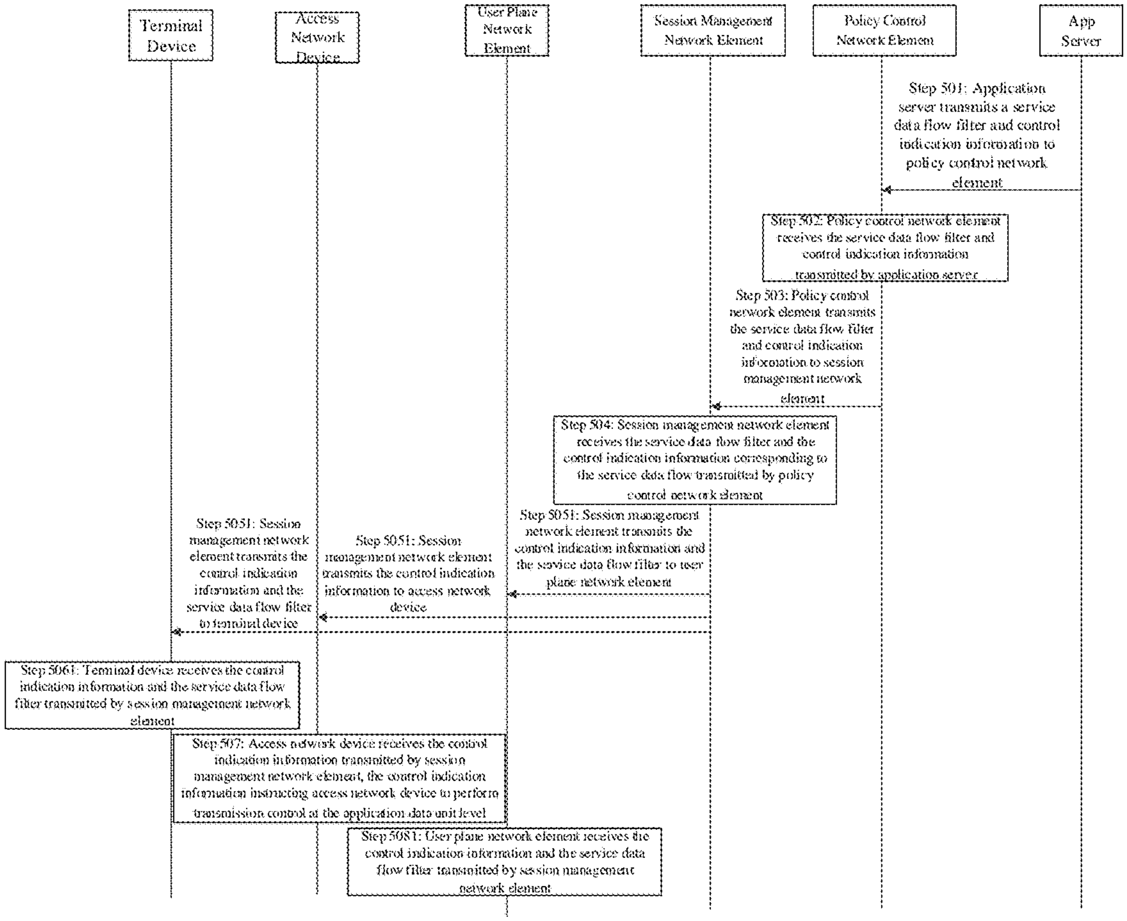
FIG. 6 is a flowchart illustrating a data transmission method according to an exemplary embodiment of the present disclosure.

Based on the embodiment shown in FIG. 5, the session management network element may further transmit the service data flow filter to the terminal device and the user plane network element. Next, the embodiment shown in FIG. 6 is used to describe the session management network element transmitting the service data flow filter and control indication information. Referring to FIG. 6, the method includes the following steps.

At Step 5051, the session management network element transmits the control indication information and the service data flow filter to the terminal device and the user plane network element, and transmits the control indication information to the access network device. The control indication information instructs the terminal to perform transmission control on the service data flow at the application data unit level. The service data flow filter is used to match the service data flow.

In an embodiment of the present disclosure, the session management network element not only transmits the control indication information to the terminal device and the user plane network element, but also transmits the service data flow filter to the terminal device and the user plane network element, thereby informing the terminal device and the user plane network element of the service data flow to be controlled at the application data unit level.

It should be noted that the embodiment of the present disclosure is only described with reference to the example where the session management network element transmits the control indication information and the service data flow filter to the terminal device and the user plane network element. In another embodiment, the session management network element may transmit the control indication information and the service data flow filter to the terminal device, but may not transmit the control indication information and the service data flow filter to the user plane network element. Alternatively, in another embodiment, the session management network element may transmit the control indication information and the service data flow filter to the user plane network element, but may not transmit the control indication information and the service data flow filter to the terminal device.

At Step 5061, the terminal device receives the control indication information and the service data flow filter transmitted by the session management network element. The control indication information instructs the terminal to perform transmission control on the service data flow at the application data unit level. The service data flow filter is used to match the service data flow.

In an embodiment of the present disclosure, after receiving the control indication information and the service data flow filter, the terminal device determines a matching service data flow based on the service data flow filter, and then determines to perform transmission control on the service data flow matching the service data flow filter at the application data unit level.

At Step 5081, the user plane network element receives the control indication information and the service data flow filter transmitted by the session management network element. The control indication information instructs the user plane network element to add application data unit information to the header information of the downlink data packet in the service data flow. The service data flow filter is used to match the service data flow.

In an embodiment of the present disclosure, after the user plane network element receives the control indication information and the service data flow filter, it determines the matching service data flow based on the service data flow filter, and then determines to perform transmission control on the service data flow matching the service data flow filter at the application data unit level.

In the data transmission method according to the embodiment of the present disclosure, the control indication information is used to indicate transmission control at the application data unit level, such that in a transmission process, data packets can be transmitted in units of application data units, so as to avoid cases where application data units cannot be constituted, thereby saving transmission resources.

Figure 7:
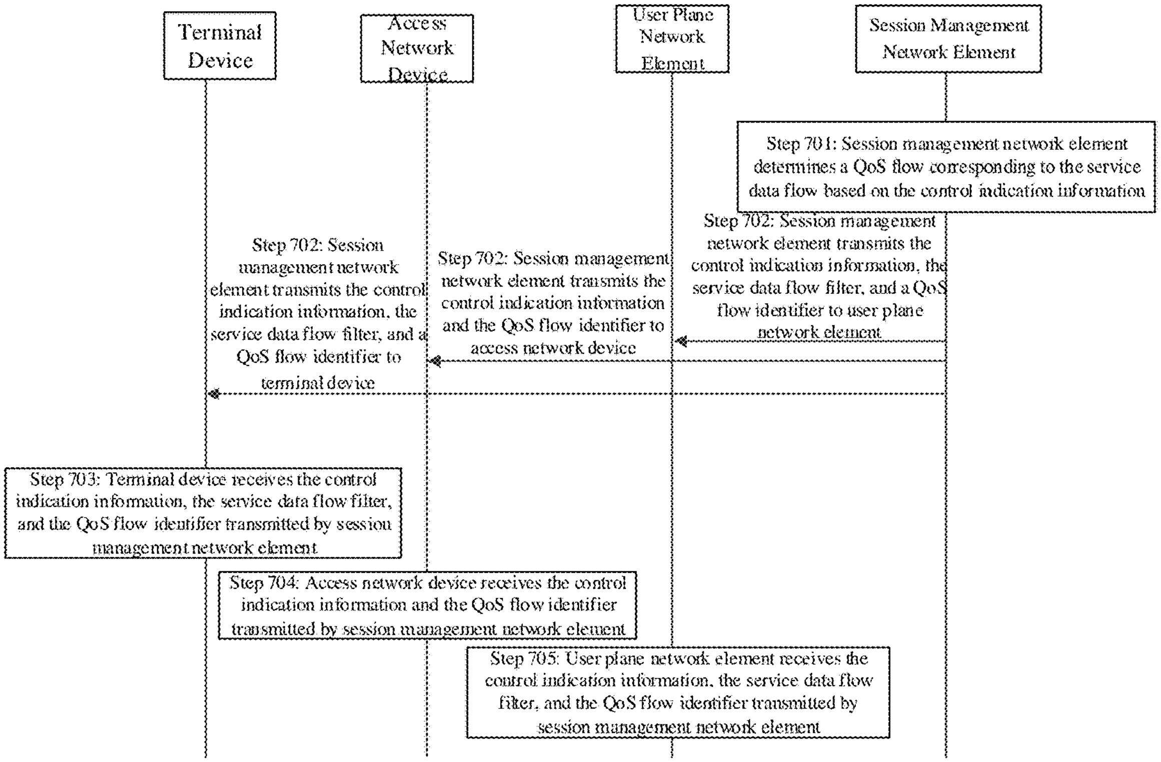
FIG. 7 is a flowchart illustrating a data transmission method according to an exemplary embodiment of the present disclosure.

Based on the embodiment shown in FIG. 6, the session management network element may further determine a QoS flow for transmitting the service data flow, and then transmit a QoS flow identifier corresponding to the QoS flow. Next, the QoS flow identifier transmitted by the session management network element will be described using the embodiment shown in FIG. 7. Referring to FIG. 7, the method includes the following steps.

At Step 701, the session management network element determines a QoS flow corresponding to the service data flow based on the control indication information.

In an embodiment of the present disclosure, after the session management network element receives the control indication information, it can determine the QoS flow corresponding to the service data flow according to the control indication information corresponding to the service data flow.

In some embodiments, the session management network element may determine that the service data flows corresponding to the control indication information are transmitted in the same QoS flow, and determine the QoS flow as the QoS flow corresponding to the service data flows.

Here, the step 701 in the embodiment of the present disclosure may be performed after the step 504 in the embodiment shown in FIG. 5.

Figure 8:
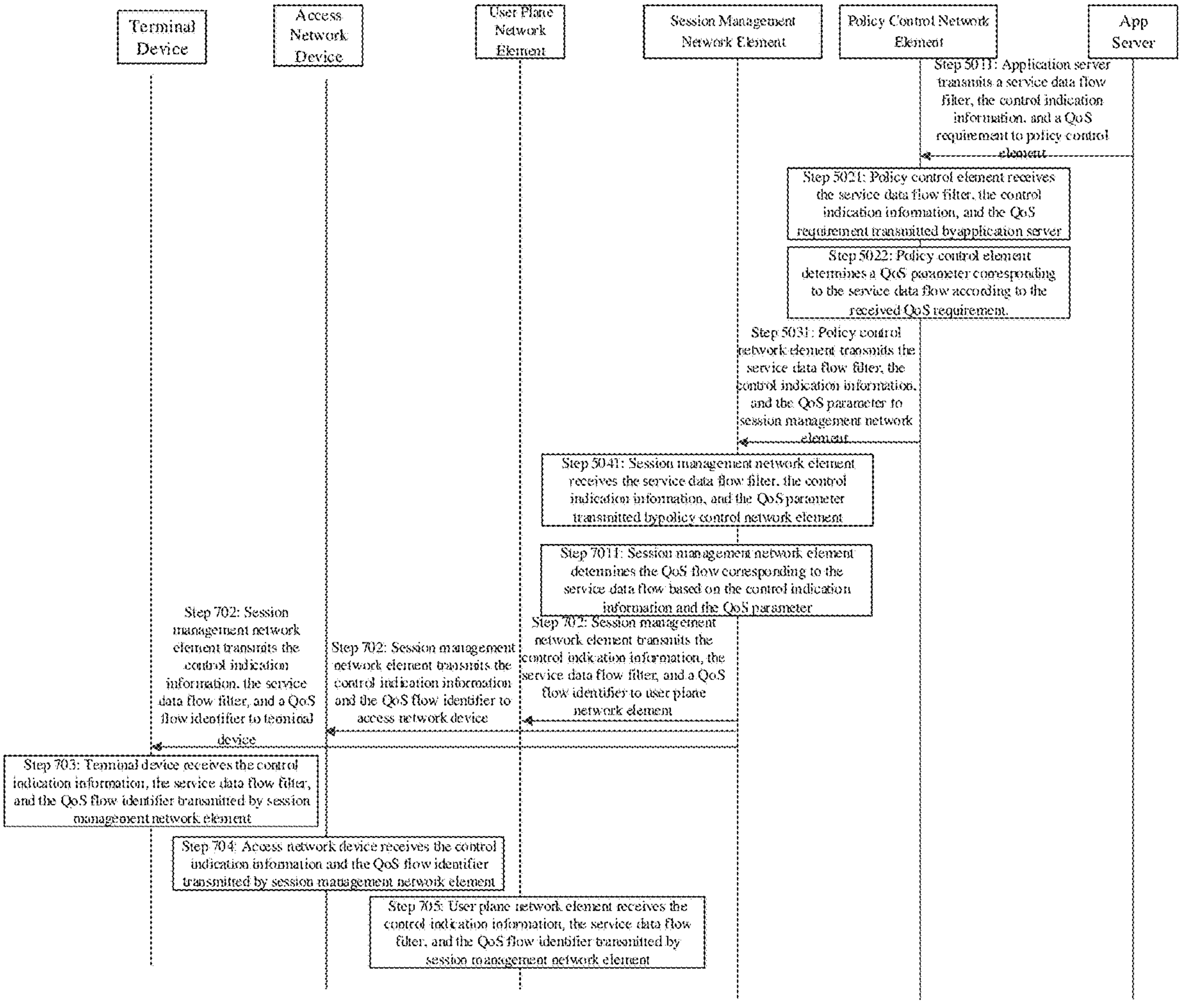
FIG. 8 is a flowchart illustrating a data transmission method according to an exemplary embodiment of the present disclosure.

It should be noted that the embodiment of the present disclosure is only described with reference to the example where the QoS flow corresponding to the service data flow is determined according to the control indication information. However, in another embodiment, the session management network element can further determine the QoS flow corresponding to the service data flow based on a QoS parameter and the control indication information. As shown in FIG. 8, the method may further include the following steps.

At Step 5011, an application server transmits a service data flow filter, the control indication information, and a QoS requirement to the policy control element.

The QoS requirement is used to indicate the QoS requirement required for transmitting service data. In an embodiment of the present disclosure, the service data flow filter transmitted by the application server to the policy control element matches the service data flow, and the service data flow has the QoS requirement. The application server transmits the service data flow filter, the control indication information, and the QoS requirement to the policy control element.

In some embodiments, the QoS requirement may include at least one of a service quality level identifier (5QI), a priority, a bit error rate, a transmission delay, or a code rate.

Here, the service quality level identifier indicates a level of service quality. The priority indicates a priority for transmitting the service data flow. The bit error rate indicates an accuracy of data transmission within a target time length. The transmission delay indicates time required during transmission of the service data flow. The code rate is the number of bits transmitted in the service data flow within a time unit.

At Step 5021, the policy control element receives the service data flow filter, the control indication information, and the QoS requirement transmitted by the application server.

At Step 5022, the policy control element determines a QoS parameter corresponding to the service data flow according to the received QoS requirement.

In an embodiment of the present disclosure, the QoS parameter indicates a QoS requirement required for the service data flow.

At Step 5031, the policy control network element transmits the service data flow filter, the control indication information, and the QoS parameter to the session management network element.

In an embodiment of the present disclosure, in the Steps 5021 to 5031, the policy control element forwards the received service data flow filter, control indication information and QoS parameter to the session management network element, and then the session management network element can distribute them to other devices.

At Step 5041, the session management network element receives the service data flow filter, the control indication information, and the QoS parameter transmitted by the policy control network element.

At Step 7011, the session management network element determines the QoS flow corresponding to the service data flow based on the control indication information and the QoS parameter.

In an embodiment of the present disclosure, after receiving the control indication information and the QoS parameter of the service data flow, the session management network element determines that the service data flows corresponding to the control indication information and having the same QoS parameter are transmitted in the same QoS flow, and determines the QoS flow to be the QoS flow corresponding to the service data flows.

In some embodiments, the service data flows with the same 5QI and ARP in their QoS parameters are determined to be transmitted in the same QoS flow.

It should be noted that the embodiment of the present disclosure is only described with reference to the example where the QoS flow is determined according to the control indication information. In another embodiment, the session management network element directly determines that all service data flows are transmitted in the same QoS flow, without distinguishing the service data flows from each other, such that different service data flows can be transmitted in different QoS flows.

The method then proceeds with Steps 702-705.

At Step 702, the session management network element transmits the control indication information, the service data flow filter, and a QoS flow identifier to the terminal device and the user plane network element, and transmits the control indication information and the QoS flow identifier to the access network device.

In an embodiment of the present disclosure, the session management network element transmits the QoS flow identifier, thereby informing other devices of the QoS flow for transmitting the service data flow.

In some embodiments, the QoS flow identifier is a QoS Flow ID (QFI) or another identifier.

At Step 703, the terminal device receives the control indication information, the service data flow filter, and the QoS flow identifier transmitted by the session management network element.

The terminal device determines the corresponding QoS flow according to the received QoS flow identifier, and then determines to perform transmission control on the service data flow transmitted in the QoS flow at the application data unit level.

Here, the Step 703 in the embodiment of the present disclosure may be performed after the Step 506 in the embodiment shown in FIG. 5.

At Step 704, the access network device receives the control indication information and the QoS flow identifier transmitted by the session management network element.

The access network device determines the corresponding QoS flow according to the received QoS flow identifier, and then determines to perform transmission control on the QoS flow at the application data unit level.

Here, the Step 704 in the embodiment of the present disclosure may be performed after the Step 507 in the embodiment shown in FIG. 5.

At Step 705, the user plane network element receives the control indication information, the service data flow filter, and the QoS flow identifier transmitted by the session management network element.

The user plane network element determines the corresponding QoS flow according to the received QoS flow identifier, and then determines to perform transmission control the QoS flow at the application data unit level.

Here, the Step 705 in the embodiment of the present disclosure may be performed after the Step 508 in the embodiment shown in FIG. 5.

It should be noted that the embodiment of the present disclosure is only described with reference to the example where the session management network element transmits the QoS identifier to the terminal device and the user plane network element. In another embodiment, the session management network element may transmit the QoS identifier to the terminal device but not to the user plane network element. Alternatively, in another embodiment, the session management network element may transmit the QoS identifier to the user plane network element but not to the terminal device.

In the data transmission method according to the embodiment of the present disclosure, the terminal device, the user plane network element and the access network device can all determine the corresponding QoS flow according to the received QoS flow identifier, and then determine based on the control indication information that transmission control at the application data unit level needs to be performed on the QoS flow, such that in a transmission process, data packets can be transmitted in units of application data units, so as to avoid cases where application data units cannot be constituted, thereby saving transmission resources.

Figure 9:
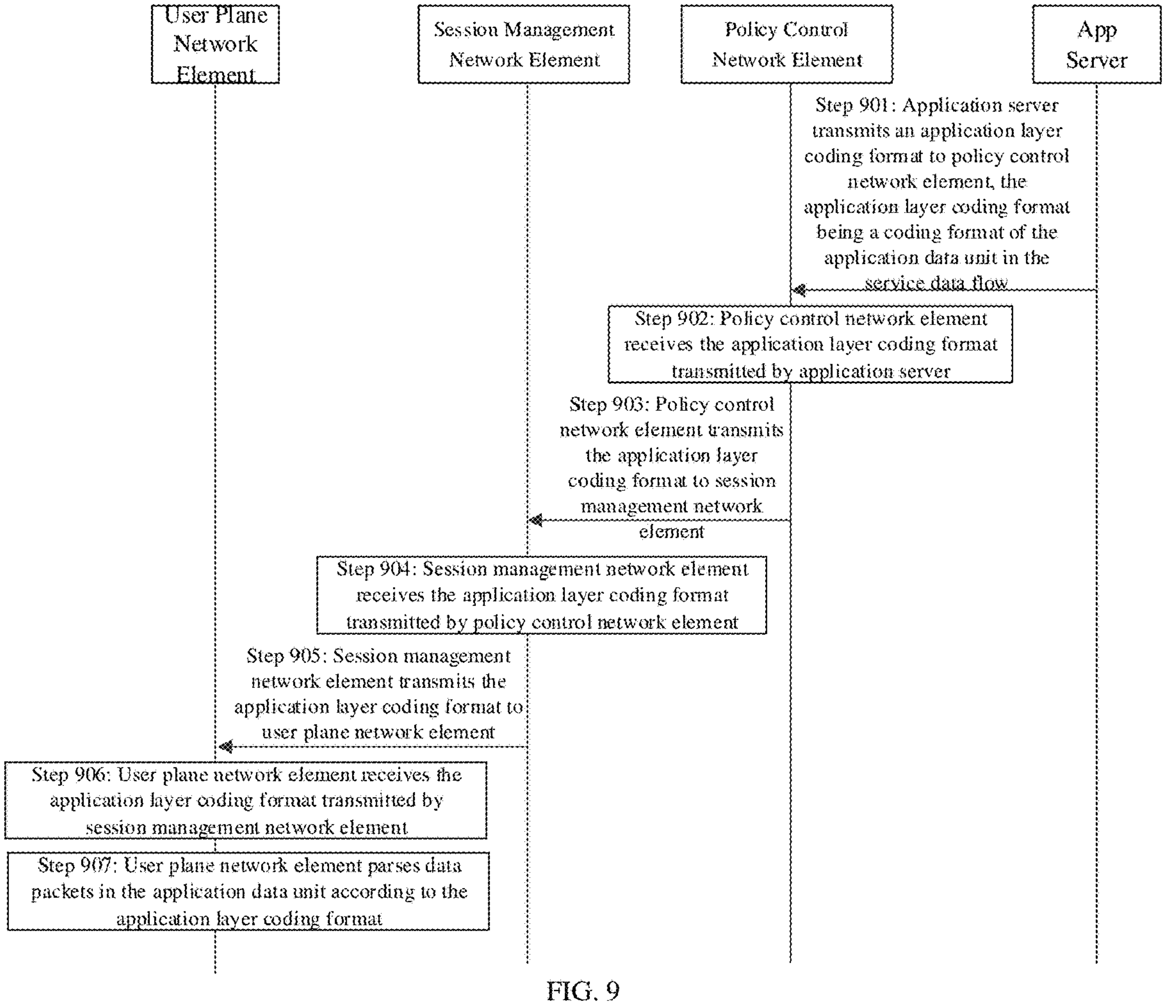
FIG. 9 is a flowchart illustrating a data transmission method according to an exemplary embodiment of the present disclosure.

Based on the embodiment shown in FIG. 5, the application server may further transmit an application layer coding format, such that the user plane network element can parse data packets in the application data unit according to the application layer coding format. Next, the application layer coding format transmitted by the application server will be described using the embodiment shown in FIG. 9. Referring to FIG. 9, the method includes the following steps.

At Step 901, the application server transmits an application layer coding format to the policy control network element. The application layer coding format is a coding format of the application data unit in the service data flow.

In an embodiment of the present disclosure, the application server not only transmits the service data flow filter and the control indication information to the policy control network element, but also transmits the application layer coding format, thereby informing other devices of the coding format of the application data unit in the service data flow transmitted by the application server, such that the other devices can parse the data packets in the application data unit in the service data flow.

In some embodiments, the application layer coding format may include H263 (a video coding format), H264 (a video coding format) or other formats, and the embodiment of the present disclosure is not limited to this.

At Step 902, the policy control network element receives the application layer coding format transmitted by the application server.

At Step 903, the policy control network element transmits the application layer coding format to the session management network element.

In an embodiment of the present disclosure, the policy control network element forwards the application layer coding format transmitted by the application server to the session management network element.

At Step 904, the session management network element receives the application layer coding format transmitted by the policy control network element.

At Step 905, the session management network element transmits the application layer coding format to the user plane network element.

At Step 906, the user plane network element receives the application layer coding format transmitted by the session management network element.

At Step 907, the user plane network element parses data packets in the application data unit according to the application layer coding format.

In an embodiment of the present disclosure, the user plane network element needs to parse the data packets in the application data unit of the service data flow to obtain the application layer information of the data packet. Therefore, the session management network element transmits the application layer coding format to the user plane network element, such that the user plane network element can parse the data packets in the application data unit according to the application layer coding format.

In the data transmission method according to the embodiment of the present disclosure, the application server transmits the application layer coding format to the user plane network element via the policy control network element and the session management network element, such that the user plane network element can parse the data packets in the application data unit in the service data flow according to the application layer coding format, thereby improving data transmission efficiency.

Figure 10:
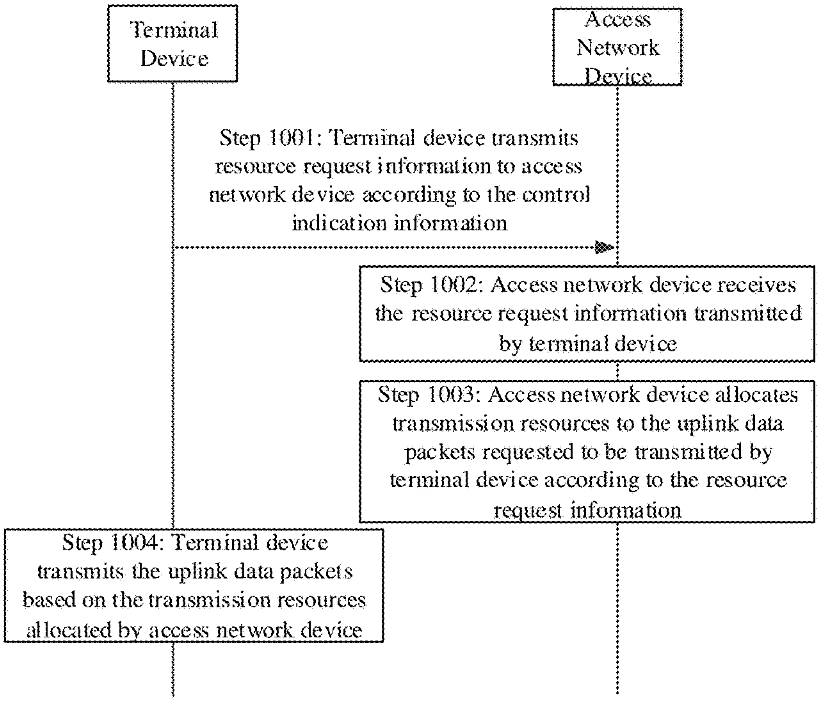
FIG. 10 is a flowchart illustrating a data transmission method according to an exemplary embodiment of the present disclosure.

The embodiment shown in FIG. 5 shows the process of transmitting the control indication information to the terminal device, the access network device, and the user plane network element, and completing the configuration of the terminal device, the access network device, and the user plane network element. Based on the embodiment shown in FIG. 5, the data can also be transmitted between the terminal device and the access network device. Next, the transmission of uplink data by the terminal device will be described using the embodiment shown in FIG. 10. Referring to FIG. 10, the method includes the following steps.

At Step 1001, the terminal device transmits resource request information to the access network device according to the control indication information. The resource request information includes application data unit information indicating an application data unit to which uplink data packets belong.

In an embodiment of the present disclosure, if the terminal device needs to transmit an uplink service data flow, it needs to first request from the access network device transmission resources for transmitting the uplink data packets in the uplink service data flow. Since transmission control is performed on the uplink service data flow at the application data unit level, the terminal device transmits the resource request information including the application data unit information to the access network device, and the access network device allocates transmission resources to the terminal device based on the resource request information.

In some embodiments, the application data unit information may include at least one of the following:

(1) Identification information of an application data unit to which data packets in the service data flow belong.

Each data packet includes application layer information, and the application layer information includes identification information of the application data unit to which the data packet belongs. Data packets with the same identification information belong to the same application data unit.

(2) Indication information of the data packets in the service data flow, data packets with same indication information belonging to a same application data unit.

Here, the indication information of the data packets is information divided according to grouping of data packets. If the indication information of data packets is the same, it means that these data packets belong to the same application data unit.

(3) A type of an application data unit to which the data packets in the service data flow belong.

In some embodiments, types of application data units include self-coding application data units, forward predictive coding application data units, bidirectional predictive coding application data units, sequence parameter sets, image parameter sets or other types. The present disclosure is not limited to this.

Here, when decoding a self-coding application data unit, only its own data needs to be considered for decoding, which will not be affected by other application data units. When decoding a forward predictive coding application data unit, it is necessary to refer to an application data unit located before the application data unit, otherwise the forward predictive coding application data unit cannot be decoded. When decoding a bidirectional predictive coding application data unit, it is necessary to refer to application data units located before and after the application data unit, otherwise the bidirectional predictive coding application data unit cannot be decoded.

(4) A level of the application data unit to which the data packets in the service data flow belong, the level of the application data unit indicating an importance of the application data unit or indicating whether the application data unit is allowed to be skipped or discarded.

(5) A size of the application data unit to which the data packets in the service data flow belong.

The application data unit information includes the size of the application data unit, and the transmission resources required to transmit the application data unit can be determined based on the size of the application data unit.

(6) Indication information of a start data packet in the application data unit to which the data packets in the service data flow belong.

(7) Indication information of an end data packet in the application data unit to which the data packets in the service data flow belong.

(8) Sequence number information of the data packets in the service data flow in the application data unit to which the data packets belong.

The application data unit includes a plurality of data packets, and the plurality of data packets are arranged in order. The sequence number information of the data packet indicates the order in which the plurality of data packets are arranged in the application data unit.

In some embodiments, the application data unit may include both the indication information of the start data packet in the application data unit to which the data packets in the service data flow belong and the indication information of the end data packet in the application data unit to which the data packets in the service data flow belong.

Here, since the application data unit information includes both the indication information of the start data packet in the application data unit to which the data packets in the service data flow belong and the indication information of the end data packet in the application data unit to which the data packets in the service data flow belong, it is possible to determine the start data packet and the end data packet in the application data unit, and then determine the data packets belonging to the same application data unit.

In other embodiments, the application data unit may include the indication information of the start data packet in the application data unit to which the data packets in the service data flow belong.

Here, since the application data unit includes the indication information of the start data packet of each application data unit, the start data packet is used as a start data packet, and the data packet preceding the next start data packet is used as an end data packet, and the data packets between the start data packet and the end data packet belong to the same application data unit.

In other embodiments, the application data unit may include the indication information of the end data packet in the application data unit to which the data packets in the service data flow belong.

Here, since the application data unit includes the indication information of the end data packet of each application data unit, the data packet following the end data packet is used as a start data packet, and the next end data packet is used as an end data packet, and the data packets between the start data packet and the end data packet belong to the same application data unit.

At Step 1002, the access network device receives the resource request information transmitted by the terminal device.

At Step 1003, the access network device allocates transmission resources to the uplink data packets requested to be transmitted by the terminal device according to the resource request information.

In an embodiment of the present disclosure, after receiving the resource request information, the access network device can allocate transmission resources to the uplink data packets according to the application data unit information included in the resource request information.

In some embodiments, the access network device may allocate the transmission resources in any of the following schemes:

(1) Scheduled transmission resources for data packets corresponding to a same Application Data Unit (ADU) identifier are continuous.

In an embodiment of the present disclosure, the access network device identifies data packets with a same ADU identifier, and schedules continuous transmission resources for the data packets with the same ADU identifier.

(2) Among data packets corresponding to a same ADU identifier, if a reference number of data packets are lost, a data packet located after the reference number of data packets is discarded by an access network device.

In an embodiment of the present disclosure, the access network device identifies data packets with the same ADU identifier. If a reference number of data packets are lost in the data packets with the same ADU identifier, other data packets that are not transmitted cannot constitute an application data unit. Therefore, the data packet located after the reference number of packets is discarded and a transmission resource is no longer scheduled for these packets.

The embodiment of the present disclosure discards other data packets that cannot constitute an application data unit to avoid the case where these data packets, even if transmitted, cannot constitute an application data unit, thereby saving transmission resources.

(3) A transmission resource for a data packet with a same ADU identifier as a transmitted data packet is prioritized to be scheduled.

In an embodiment of the present disclosure, the access network device prioritizes scheduling of a transmission resource for a data packet with the same ADU identifier as a transmitted data packet.

In some embodiments, the transmission resources of the terminal device may conflict, or the terminal device may fail in Listen Before Talk. In this case, the transmission resources of the terminal device are limited, and the access network device needs to prioritize scheduling of a transmission resource for a data packet with the same ADU identifier as a transmitted data packet.

(4) If any application data unit is lost, data packets of a reference application data unit corresponding to the application data unit are discarded by the access network device, the reference application data unit being determined according to a type of the application data unit.

In an embodiment of the present disclosure, the access network device can determine the type of each application data unit according to the type of the application data unit to which the data packets belong. If any application data unit is lost, it can determine the reference application data unit corresponding to the application data unit according to the type of the application data unit, and discard the determined reference application data unit.

For example, if the application data unit following the lost application data unit is a forward predictive coding application data unit, and since the forward predictive coding application data unit needs to refer to the application data unit located before the application data unit when decoding, the application data unit located after the application data unit is determined as a reference application data unit, and the reference application data unit is discarded.

In another example, if the application data unit preceding the lost application data unit is a bidirectional predictive coding application data unit, and since the bidirectional predictive coding application data unit needs to refer to the application data units before and after the application data unit when decoding, therefore the application data unit located before the application data unit is determined as the reference application data unit, and the reference application data unit is discarded.

(5) Transmission resources for data packets of an application data unit having a predetermined level are prioritized to be scheduled by the access network device.

In some embodiments, the application data unit has a level. If the level indicates the importance of the application data unit, the access network device prioritizes scheduling of transmission resources for the data packets in the application data unit with a high level.

In some other embodiments, the application data unit has a level, and the level indicates that the application data unit is not allowed to be discarded, then the access network device prioritizes scheduling of transmission resources for the data packets in the application data unit that is not allowed to be discarded.

At Step 1004, the terminal device transmits the uplink data packets based on the transmission resources allocated by the access network device.

The access network device allocates transmission resources to the terminal device, and the terminal device can transmit uplink data packets based on the transmission resources allocated by the access network device.

In the method according to the embodiment of the present disclosure, the access network device allocates transmission resources to the terminal device according to the resource request information transmitted by the terminal device, and when the access network device allocates transmission resources, it performs transmission control on the uplink data packets at the application data unit level. This avoids cases where application data units cannot be constituted, thereby saving transmission resources.

Figure 11:
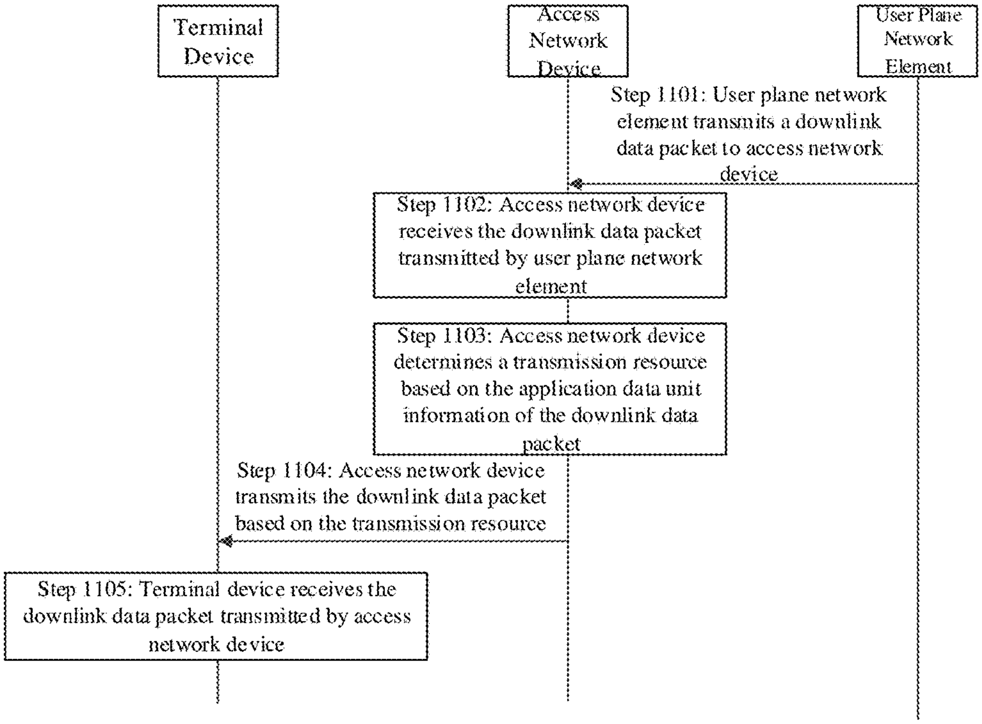
FIG. 11 is a flowchart illustrating a data transmission method according to an exemplary embodiment of the present disclosure.

The embodiment shown in FIG. 5 shows the process of transmitting the control indication information to the terminal device, the access network device, and the user plane network element, and completing the configuration of the terminal device, the access network device, and the user plane network element. Based on the embodiment shown in FIG. 5, the data can also be transmitted between the terminal device and the access network device. Next, the transmission of downlink data by the access network device will be described using the embodiment shown in FIG. 11. Referring to FIG. 11, the method includes the following steps.

At Step 1101, the user plane network element transmits a downlink data packet to the access network device.

In some embodiments, after the user plane network element obtains the downlink data packet, it will first process the downlink data packet, and then transmit the downlink data packet to the access network device, such that the access network device can identify the application data unit information in the downlink data packet.

The user plane network element obtains the downlink data packet in the service data flow and adds the application data unit information of the downlink data packet to header information of the downlink data packet.

Optionally, the user plane network element identifies the application data unit information included in application layer information of the downlink data packet, and adds the application data unit information of the downlink data packet to the header information of the downlink data packet.

In an embodiment of the present disclosure, the user plane network element can identify the application layer information in the downlink data packet. Then, after the user plane network element identifies the application layer information of the downlink data packet, it adds the application data unit information included in the application layer information to the header information of the downlink data packet, such that the access network device can determine the application data unit information of the downlink data packet by reading the header information.

Figure 12:
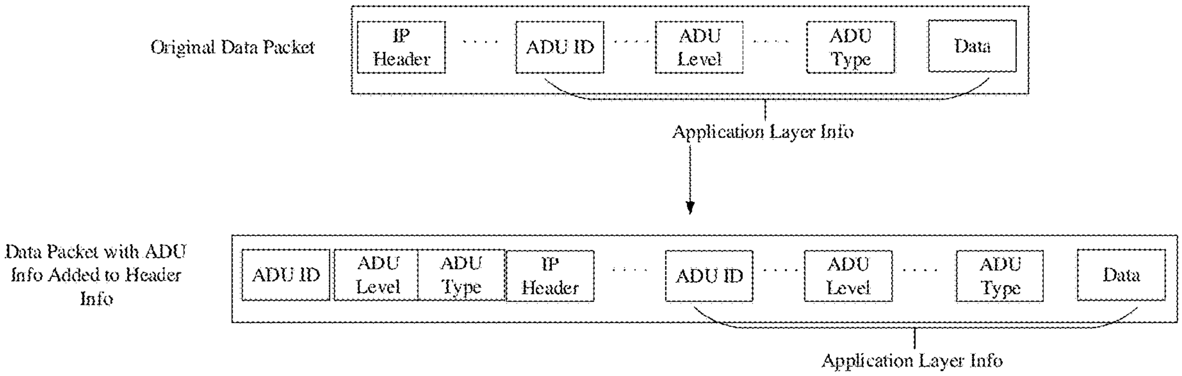
FIG. 12 is a schematic diagram showing a structure of a data packet according to an exemplary embodiment of the present disclosure.

For example, as shown in FIG. 12, after obtaining the downlink data packet, the user plane network element identifies an ADU identifier, an ADU level, and an ADU type of the downlink data packet, and adds the ADU identifier, ADU level and ADU type to the header information of the downlink data packet.

It should be noted that the embodiment of the present disclosure is only explained using FIG. 12 as an example. The user plane network element can add at least one of the ADU identifier, ADU level and ADU type in the header information of the downlink data packet, and the present disclosure is not limited to adding all of the ADU identifier, ADU level and ADU type to the header information. Moreover, the embodiment of the present disclosure is not limited to any specific order of the ADU identifier, ADU level and ADU type, and they can be added to the header information in other orders.

Figure 13:
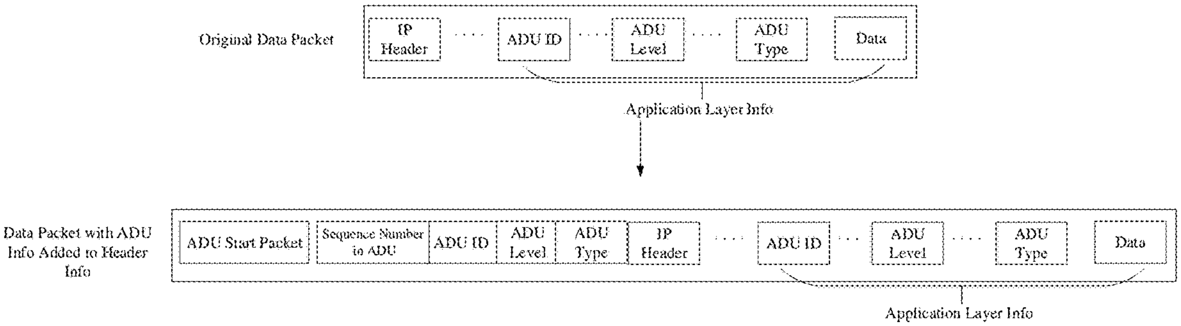
FIG. 13 is a schematic diagram showing a structure of a data packet according to an exemplary embodiment of the present disclosure.

In another example, as shown in FIG. 13, after obtaining the downlink data packet, the user plane network element identifies an ADU identifier, an ADU level, an ADU type, an ADU start data packet, and a sequence number of the data packet in the ADU of the downlink data packet, and adds the ADU identifier, the ADU level, the ADU type, the ADU start data packet, and the sequence number of the data packet in the ADU to the header information of the downlink data packet.

It should be noted that the embodiment of the present disclosure is only explained using FIG. 13 as an example. The user plane network element can add at least one of the ADU identifier, the ADU level, the ADU type, the ADU start data packet, and the sequence number of the data packet in the ADU to the header information of the downlink data packet, and the present disclosure is not limited to adding all of the ADU identifier, the ADU level, the ADU type, the ADU start data packet, and the sequence number of the data packet in the ADU to the header information of the downlink data packet. Moreover, the embodiment of the present disclosure is not limited to any specific order of the ADU identifier, the ADU level, the ADU type, the ADU start data packet, and the sequence number of the data packet in the ADU, and they can be added to the header information in other orders.

Optionally, the user plane network element may group downlink data packets, determine the application data unit information, and add the application data unit information of the downlink data packets to the header information of the downlink data packets.

In an embodiment of the present disclosure, the user plane network element can identify downlink data packets belonging to the same application data unit, and then group these data packets, and then allocate the same application data unit information to the downlink data packets belonging to the same group, and add the application data unit information of the downlink data packets to the header information of the downlink data packets.

In some embodiments, downlink data packets belonging to the same group are assigned with the same application data unit information as the indication information.

In some embodiments, the header information of the downlink data packet may further include a QoS flow identifier, and the QoS flow identifier indicates the QoS flow for transmitting the downlink data packet.

In some embodiments, the application data unit information may include at least one of the following:

(1) identification information of an application data unit to which the downlink data packet belongs;

(2) indication information of the downlink data packet, data packets with same indication information belonging to a same application data unit;

(3) a type of an application data unit to which the downlink data packet belongs;

(4) a level of the application data unit to which the downlink data packet belongs, the level of the application data unit indicating an importance of the application data unit or indicating whether the application data unit is allowed to be skipped or discarded;

(5) a size of the application data unit to which the downlink data packet belongs;

(6) indication information of a start data packet in the application data unit to which the downlink data packet belongs;

(7) indication information of an end data packet in the application data unit to which the downlink data packet belongs; and (8) sequence number information of the downlink data packet in the application data unit to which the downlink data packet belongs.

The application data unit information in the embodiment of the present disclosure is similar to the application data unit information in the embodiment shown in FIG. 9, and details thereof will be omitted here.

At Step 1102, the access network device receives the downlink data packet transmitted by the user plane network element.

The header information of the downlink data packet includes application data unit information, and the application data unit information indicates the application data unit to which the downlink data packet belongs.

At Step 1103, the access network device determines a transmission resource based on the application data unit information of the downlink data packet.

In some embodiments, the access network device determines the transmission resource in any of the following schemes:

(1) scheduled transmission resources for data packets corresponding to a same Application Data Unit (ADU) identifier are continuous;

(2) among data packets corresponding to a same ADU identifier, if a reference number of data packets are lost, a data packet located after the reference number of data packets is discarded by an access network device;

(3) a transmission resource for a data packet with a same ADU identifier as a transmitted data packet is prioritized to be scheduled;

(4) if any application data unit is lost, data packets of a reference application data unit corresponding to the application data unit are discarded by the access network device, the reference application data unit being determined according to a type of the application data unit; and (5) transmission resources for data packets of an application data unit having a predetermined level are prioritized to be scheduled by the access network device.

The schemes in which the access network device determines the transmission resource in the embodiment of the present disclosure are similar to the schemes in which the transmission resource is determined in the embodiment shown in FIG. 9, and details thereof will be omitted here.

At Step 1104, the access network device transmits the downlink data packet based on the transmission resource.

At Step 1105, the terminal device receives the downlink data packet transmitted by the access network device.

In the data transmission method according to the embodiment of the present disclosure, the access network device determines the transmission resource based on the application data unit information of the downlink data packet, and when the access network device determines the transmission resource, it performs transmission control on the downlink data packet at the application data unit level, so as to avoid the case where the application data unit cannot be constituted, thereby saving transmission resources.

It should be noted that the above embodiments can be separated or combined arbitrarily, and the present disclosure is not limited to any separation or combination of the embodiments.

Figure 14:
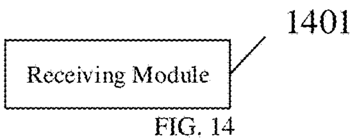
FIG. 14 is a block diagram of a communication device according to an exemplary embodiment of the present disclosure.

FIG. 14 shows a block diagram of a data transmission apparatus according to an exemplary embodiment of the present disclosure. Referring to FIG. 14, the apparatus includes:

a receiving module 1401 configured to receive control indication information transmitted by a session management network element.

The control indication information instructs the terminal device to perform transmission control on a service data flow at an application data unit level.

In some embodiments, the receiving module 1401 may be configured to receive the control indication information and a service data flow filter transmitted by the session management network element.

Here, the service data flow filter is used to match the service data flow.

In some embodiments, the receiving module 1401 may be configured to receive a Quality of Service (QoS) flow identifier transmitted by the session management network element.

Here, the service data flow is transmitted via a QoS flow corresponding to the QoS flow identifier.

Figure 15:
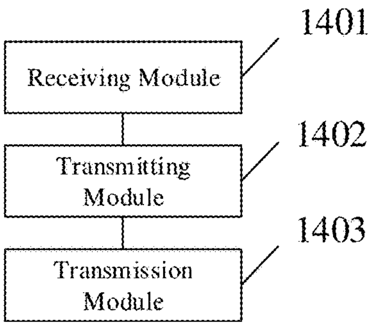
FIG. 15 is a block diagram of a communication device according to an exemplary embodiment of the present disclosure.

In some embodiments, the service data flow may be an uplink data flow including a plurality of uplink data packets. Referring to FIG. 15, the apparatus may further include:

a transmitting module 1402 configured to transmit resource request information to an access network device according to the control indication information, the resource request information including application data unit information indicating an application data unit to which the uplink data packets belong; and a transmission module 1403 configured to transmit the uplink data packets based on a transmission resource allocated by the access network device, the transmission resource allocated by the access network device being determined by the access network device based on the resource request information.

In some embodiments, the resource request information may further include a QoS flow identifier and/or a radio bearer identifier corresponding to the uplink data packets.

In some embodiments, the application data unit information may include at least one of:

identification information of an application data unit to which data packets in the service data flow belong;

indication information of the data packets in the service data flow, data packets with same indication information belonging to a same application data unit;

a type of an application data unit to which the data packets in the service data flow belong;

a level of the application data unit to which the data packets in the service data flow belong, the level of the application data unit indicating an importance of the application data unit or indicating whether the application data unit is allowed to be skipped or discarded;

a size of the application data unit to which the data packets in the service data flow belong;

indication information of a start data packet in the application data unit to which the data packets in the service data flow belong;

indication information of an end data packet in the application data unit to which the data packets in the service data flow belong; and sequence number information of the data packets in the service data flow in the application data unit to which the data packets belong.

In some embodiments, scheduled transmission resources for data packets corresponding to a same Application Data Unit (ADU) identifier are continuous; or among data packets corresponding to a same ADU identifier, if a reference number of data packets are lost, a data packet located after the reference number of data packets is discarded by an access network device; or a transmission resource for a data packet with a same ADU identifier as a transmitted data packet is prioritized to be scheduled; or if any application data unit is lost, data packets of a reference application data unit corresponding to the application data unit are discarded by the access network device, the reference application data unit being determined according to a type of the application data unit; or transmission resources for data packets of an application data unit having a predetermined level are prioritized to be scheduled by the access network device.

It should be noted that when implementing the functions of the apparatus according to the above embodiments, the division of the above functional modules is used as an example only. In practical applications, the above functions can be allocated to different functional modules depending on requirements, that is, the internal structure of the apparatus is divided into different functional modules to complete all or part of the functions described above. In addition, the apparatus provided in the above embodiments and the method embodiments belong to the same concept, and the specific implementation process can be found in the method embodiments, and details thereof will be omitted here.

Figure 16:
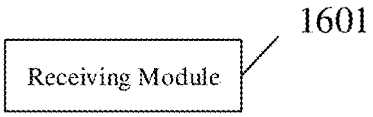
FIG. 16 is a block diagram of a communication device according to an exemplary embodiment of the present disclosure.

FIG. 16 shows a block diagram of a data transmission apparatus according to an exemplary embodiment of the present disclosure. Referring to FIG. 16, the apparatus includes:

a receiving module 1601 configured to receive control indication information transmitted by a session management network element.

Here, the control indication information instructs the access network device to perform transmission control at an application data unit level.

In some embodiments, the receiving module 1601 may be configured to receive the control indication information and a QoS flow identifier transmitted by the session management network element.

Here, the control indication information instructs to perform transmission control on a QoS flow corresponding to the QoS flow identifier at the application data unit level.

Figure 17:
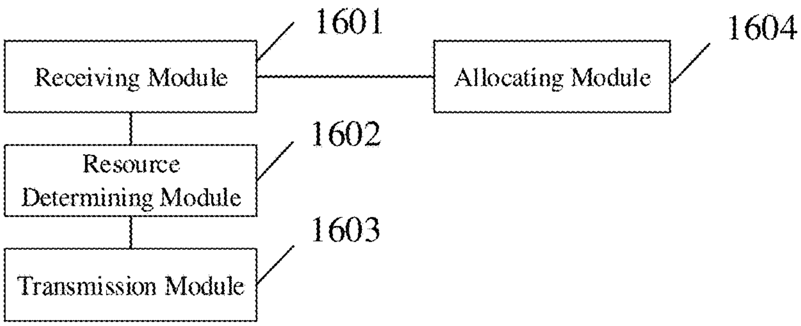
FIG. 17 is a block diagram of a communication device according to an exemplary embodiment of the present disclosure.

In some embodiments, the service data flow may be a downlink data flow. Referring to FIG. 17, the receiving module 1601 may be configured to receive a downlink data packet transmitted by a user plane network element, header information of the downlink data packet including application data unit information indicating an application data unit to which the downlink data packet belongs.

The apparatus may further include:

a resource determining module 1602 configured to determine a transmission resource according to the application data unit information of the downlink data packet; and a transmission module 1603 configured to transmit the downlink data packet based on the transmission resource.

In some embodiments, the header information of the downlink data packet may further include a QoS flow identifier indicating a QoS flow for transmitting the downlink data packet.

In some embodiments, the application data unit information in the header information may be added by the user plane network element.

In some embodiments, the application layer information of the downlink data packet may include application data unit information of the downlink data packet, the application data unit information being identified from the application layer information and added to the header information by the user plane network element.

In some embodiments, the application data unit information in the header information may be determined by the user plane network element after grouping the downlink data packet.

In some embodiments, the receiving module 1601 may be configured to receive resource request information transmitted by a terminal device, the resource request information including application data unit information indicating an application data unit to which uplink data packets requested to be transmitted by the terminal device belong.

The apparatus may further include:

an allocation module 1604 configured to allocate transmission resources to the uplink data packets requested to be transmitted by the terminal device according to the resource request information.

In some embodiments, the resource request information may further include a QoS flow identifier and/or a radio bearer identifier corresponding to the uplink data packets.

In some embodiments, the application data unit information may include at least one of:

identification information of an application data unit to which the downlink data packet belongs;

indication information of the downlink data packet, data packets with same indication information belonging to a same application data unit;

a type of an application data unit to which the downlink data packet belongs;

a level of the application data unit to which the downlink data packet belongs, the level of the application data unit indicating an importance of the application data unit or indicating whether the application data unit is allowed to be skipped or discarded;

a size of the application data unit to which the downlink data packet belongs;

indication information of a start data packet in the application data unit to which the downlink data packet belongs;

indication information of an end data packet in the application data unit to which the downlink data packet belongs; and sequence number information of the downlink data packet in the application data unit to which the downlink data packet belongs.

In some embodiments, performing the transmission control on the service data flow at the application data unit level may include any of:

scheduling continuous transmission resources for data packets corresponding to a same ADU identifier; or among the data packets corresponding to a same ADU identifier, discarding, if a reference number of data packets are lost, a data packet located after the reference number of data packets; or prioritizing scheduling of a transmission resource for a data packet with a same ADU identifier as a transmitted data packet; or discarding, if any application data unit is lost, a reference application data unit corresponding to the application data unit, the reference application data unit being determined according to a type of the application data unit; or prioritizing scheduling of transmission resources for data packets of an application data unit having a predetermined level.

It should be noted that when implementing the functions of the apparatus according to the above embodiments, the division of the above functional modules is used as an example only. In practical applications, the above functions can be allocated to different functional modules depending on requirements, that is, the internal structure of the apparatus is divided into different functional modules to complete all or part of the functions described above. In addition, the apparatus provided in the above embodiments and the method embodiments belong to the same concept, and the specific implementation process can be found in the method embodiments, and details thereof will be omitted here.

Figure 18:
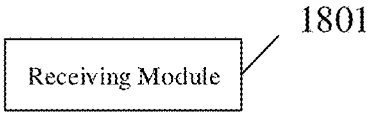
FIG. 18 is a block diagram of a communication device according to an exemplary embodiment of the present disclosure.

FIG. 18 shows a block diagram of a data transmission apparatus according to an exemplary embodiment of the present disclosure. Referring to FIG. 18, the apparatus includes:

a receiving module 1801 configured to receive control indication information transmitted by a session management network element, the control indication information instructing a user plane network element to add application data unit information to header information of a downlink data packet in a service data flow.

In some embodiments, the receiving module 1801 may be configured to receive the control indication information and a service data flow filter transmitted by the session management network element.

Here, the service data flow filter is used to match the service data flow.

In some embodiments, the receiving module 1801 may be configured to receive a QoS flow identifier transmitted by the session management network element.

Here, the service data flow is transmitted via a QoS flow corresponding to the QoS flow identifier.

Figure 19:
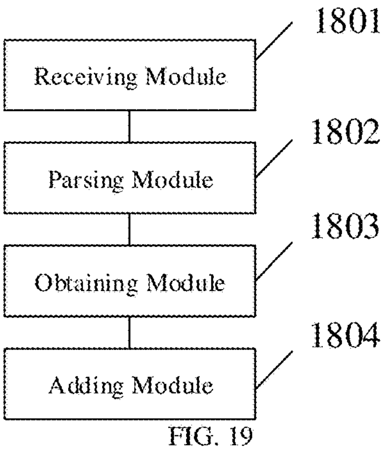
FIG. 19 is a block diagram of a communication device according to an exemplary embodiment of the present disclosure.

In some embodiments, referring to FIG. 19, the receiving module 1801 may be configured to receive an application layer coding format transmitted by the session management network element, the application layer coding format being a coding format of an application data unit in the service data flow.

The apparatus may further include: a parsing module 1802 configured to parse downlink data packets in the application data unit according to the application layer coding format.

In some embodiments, referring to FIG. 19, the apparatus may further include: an obtaining module 1803 configured to obtain the downlink data packet in the service data flow; and an adding module 1804 configured to add the application data unit information of the downlink data packet to the header information of the downlink data packet.

In some embodiments, the adding module 1804 may be configured to: identify application data unit information included in application layer information of the downlink data packet; and add the application data unit information of the downlink data packet to the header information of the downlink data packet.

In some embodiments, the adding module 1804 may be configured to: group the downlink data packet to determine the application data unit information; and add the application data unit information of the downlink data packet to the header information of the downlink data packet.

In some embodiments, the header information of the downlink data packet may further include a QoS flow identifier indicating a QoS flow for transmitting the downlink data packet.

In some embodiments, the application data unit information may include at least one of:

identification information of an application data unit to which data packets in the service data flow belong;

indication information of the data packets in the service data flow, data packets with same indication information belonging to a same application data unit;

a type of an application data unit to which the data packets in the service data flow belong;

a level of the application data unit to which the data packets in the service data flow belong, the level of the application data unit indicating an importance of the application data unit or indicating whether the application data unit is allowed to be skipped or discarded;

a size of the application data unit to which the data packets in the service data flow belong;

indication information of a start data packet in the application data unit to which the data packets in the service data flow belong;

indication information of an end data packet in the application data unit to which the data packets in the service data flow belong; and sequence number information of the data packets in the service data flow in the application data unit to which the data packets belong.

It should be noted that when implementing the functions of the apparatus according to the above embodiments, the division of the above functional modules is used as an example only. In practical applications, the above functions can be allocated to different functional modules depending on requirements, that is, the internal structure of the apparatus is divided into different functional modules to complete all or part of the functions described above. In addition, the apparatus provided in the above embodiments and the method embodiments belong to the same concept, and the specific implementation process can be found in the method embodiments, and details thereof will be omitted here.

Figure 20:
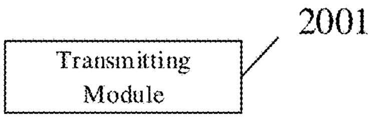
FIG. 20 is a block diagram of a communication device according to an exemplary embodiment of the present disclosure.

FIG. 20 shows a block diagram of a data transmission apparatus according to an exemplary embodiment of the present disclosure. Referring to FIG. 20, the apparatus includes:

a transmitting module 2001 configured to transmit control indication information, the control indication information instructing a receiving device to perform transmission control at an application data unit level.

In some embodiments, the receiving device may include a terminal device and/or a user plane network element, and the transmitting module 2001 may be configured to transmit the control indication information and a service data flow filter to the terminal device and/or the user plane network element.

Here, the service data flow filter is used to match a service data flow, and the user plane network element adds application data unit information to header information of a downlink data packet in the service data flow according to the control indication information.

In some embodiments, the transmitting module 2001 may be configured to transmit a QoS flow identifier to the terminal device and/or the user plane network element.

Here, the service data flow is transmitted via a QoS flow corresponding to the QoS flow identifier.

In some embodiments, the receiving device may include an access network device, and the transmitting module 2001 may be configured to transmit the control indication information to the access network device, and the access network device performs the transmission control at the application data unit level.

In some embodiments, the transmitting module 2001 may be configured to transmit a QoS flow identifier to the access network device.

Here, the control indication information instructs the transmission control on a QoS flow corresponding to the QoS flow identifier at the application data unit level.

In some embodiments, the transmitting module 2001 may be configured to transmit an application layer coding format to the user plane network element, the application layer coding format being a coding format of an application data unit in the service data flow.

Here, the user plane network element parses data packets in the application data unit according to the application layer coding format.

Figure 21:
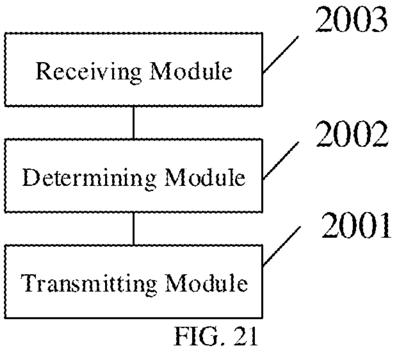
FIG. 21 is a block diagram of a communication device according to an exemplary embodiment of the present disclosure.

In some embodiments, referring to FIG. 21, the apparatus may further include:

a receiving module 2002 configured to receive a service data flow filter and control indication information corresponding to a service data flow transmitted by a policy control network element; and a determining module 2003 configured to determine a QoS flow corresponding to the service data flow according to the control indication information.

In some embodiments, the receiving module 2002 may be configured to receive a QoS parameter transmitted by the policy control network element, the QoS parameter being used to indicate a QoS requirement for transmitting the service data flow; and the determining module 2003 may be configured to determine a QoS flow corresponding to the service data flow according to the control indication information and the QoS parameter.

In some embodiments, the apparatus may further include:

a receiving module 2002 configured to receive an application layer coding format transmitted by a policy control network element, the application layer coding format being a coding format of an application data unit in the service data flow.

It should be noted that when implementing the functions of the apparatus according to the above embodiments, the division of the above functional modules is used as an example only. In practical applications, the above functions can be allocated to different functional modules depending on requirements, that is, the internal structure of the apparatus is divided into different functional modules to complete all or part of the functions described above. In addition, the apparatus provided in the above embodiments and the method embodiments belong to the same concept, and the specific implementation process can be found in the method embodiments, and details thereof will be omitted here.

Figure 22:
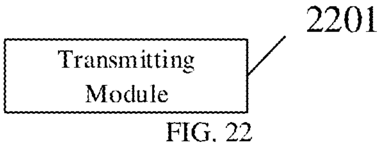
FIG. 22 is a block diagram of a communication device according to an exemplary embodiment of the present disclosure.

FIG. 22 shows a block diagram of a data transmission apparatus according to an exemplary embodiment of the present disclosure. Referring to FIG. 22, the apparatus includes:

a transmitting module 2201 configured to transmit a service data flow filter and control indication information to a session management network element, the control indication information indicating transmission control on a service data flow at an application data unit level, and the service data flow filter being used to match the service data flow.

In some embodiments, the transmitting module 2201 may be configured to transmit a QoS parameter to the session management network element, the QoS parameter being used to indicate a QoS requirement for transmitting the service data flow, the QoS parameter being determined by the session management network element according to a QoS requirement transmitted by an application server.

In some embodiments, the transmitting module 2201 may be configured to transmit an application layer coding format to the session management network element, the application layer coding format being a coding format of an application data unit in the service data flow.

Figure 23:
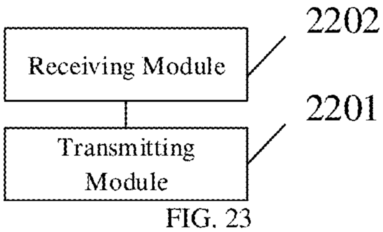
FIG. 23 is a block diagram of a communication device according to an exemplary embodiment of the present disclosure.

In some embodiments, referring to FIG. 23, the apparatus may further include:

a receiving module 2202 configured to receive the service data flow filter and the control indication information transmitted by an application server.

In some embodiments, the receiving module 2202 may be configured to receive a QoS requirement transmitted by an application server, the QoS requirement being used to indicate a QoS requirement for transmitting the service data flow.

In some embodiments, the receiving module 2202 may be configured to receive an application layer coding format transmitted by an application server, the application layer coding format being a coding format of an application data unit in the service data flow.

It should be noted that when implementing the functions of the apparatus according to the above embodiments, the division of the above functional modules is used as an example only. In practical applications, the above functions can be allocated to different functional modules depending on requirements, that is, the internal structure of the apparatus is divided into different functional modules to complete all or part of the functions described above. In addition, the apparatus provided in the above embodiments and the method embodiments belong to the same concept, and the specific implementation process can be found in the method embodiments, and details thereof will be omitted here.

Figure 24:
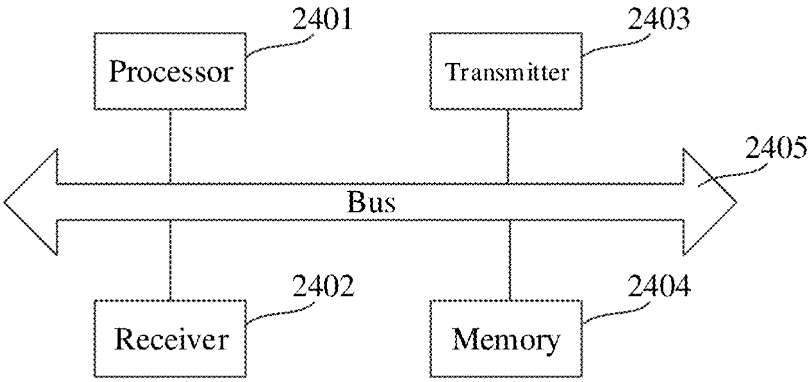
FIG. 24 is a schematic diagram showing a structure of a communication device according to an exemplary embodiment of the present disclosure.

FIG. 24 is a schematic diagram showing a structure of a communication device according to an exemplary embodiment of the present disclosure. The communication device includes: a processor 2401, a receiver 2402, a transmitter 2403, a memory 2404 and a bus 2405.

The processor 2401 includes one or more processing cores. The processor 2401 executes various functional applications and information processing by running software programs and modules. The receiver 2402 and the transmitter 2403 can be implemented as a communication component, which can be a communication chip. The memory 2404 is connected to the processor 2401 via the bus 2405.

The memory 2404 can be configured to store at least one program code, and the processor 2401 is configured to execute the at least one program code to implement the steps in any of the above method embodiments.

In addition, the communication device may be a terminal device, an access network device, a user plane network element, a session management network element, or a policy control network element. The memory 2404 may be implemented by any type of volatile or non-volatile storage device, or a combination thereof. The volatile or non-volatile storage devices include, but not limited to: magnetic or optical disk, Electrically Erasable Programmable Read Only Memory (EEPROM), Erasable Programmable Read Only Memory (EPROM), Static Random Access Memory (SRAM), Read Only Memory (ROM), magnetic memory, flash memory, and Programmable Read-Only Memory (PROM).

In an exemplary embodiment, a computer-readable storage medium is also provided. The computer-readable storage medium has executable program codes stored therein. The executable program codes are loaded and executed by a processor to implement the data transmission method performed by the communication device according to any of the above method embodiments.

In an exemplary embodiment, a chip is provided. The chip includes programmable logic circuits and/or program instructions. The chip, when running on a communication device, implements the data transmission method according to any of the above method embodiments.

In an exemplary embodiment, a computer program product is provided. The computer program product, when executed by a processor of a communication device, implements the data transmission method according to any of the above method embodiments.

It can be appreciated by those of ordinary skill in the art that all or part of the steps in the above embodiments can be implemented by hardware, or can be implemented by relevant hardware executing instructions of a program. The program can be stored in a computer-readable storage medium. The above storage medium can be a read-only memory, a magnetic disk, or an optical disc, etc.

While the optional embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. An access network device, comprising a processor, a transceiver coupled to the processor, and a memory storing program codes executable by the processor;

wherein the access network device is configured to execute the executable program codes to implement:

receiving control indication information transmitted by a session management network element, wherein the control indication information instructs the access network device to perform transmission control at an application data unit level;

receiving a downlink data packet transmitted by a user plane network element, header information of the downlink data packet including application data unit information indicating an application data unit to which the downlink data packet belongs;

determining a transmission resource according to the application data unit information of the downlink data packet; and transmitting the downlink data packet based on the transmission resource;

wherein the application data unit information comprises at least one of:

a level of the application data unit to which the downlink data packet belongs, the level of the application data unit indicating an importance of the application data unit;

a size of the application data unit to which the downlink data packet belongs;

indication information of an end data packet in the application data unit to which the downlink data packet belongs; or sequence number information of the downlink data packet in the application data unit to which the downlink data packet belongs.

2. The access network device according to claim 1, wherein the application data unit information in the header information is added by the user plane network element.

3. The access network device according to claim 2, wherein application layer information of the downlink data packet comprises the application data unit information of the downlink data packet, the application data unit information being identified from the application layer information and added to the header information by the user plane network element.

4. The access network device according to claim 1, wherein a service data flow comprises a plurality of application data units, and each application data unit indicates a video frame in a video data stream or a coded segment in a video frame.

5. The access network device according to claim 1, wherein the application data unit information further comprises at least one of:

identification information of an application data unit to which the downlink data packet belongs;

indication information of the downlink data packet, data packets with same indication information belonging to a same application data unit; and a type of an application data unit to which the downlink data packet belongs.

6. The access network device according to claim 1, wherein said performing the transmission control on the service data flow at the application data unit level comprises any of:

scheduling continuous transmission resources for data packets corresponding to a same application data unit identifier; or among the data packets corresponding to a same application data unit identifier, discarding, when a reference number of data packets are lost, a data packet located after the reference number of data packets; or prioritizing scheduling of a transmission resource for a data packet with a same application data unit identifier as a transmitted data packet; or discarding, when any application data unit is lost, a reference application data unit corresponding to the application data unit, the reference application data unit being determined according to a type of the application data unit; or prioritizing scheduling of transmission resources for data packets of an application data unit having a predetermined level.

7. A user plane network element, comprising a processor, a transceiver coupled to the processor, and a memory storing program codes executable by the processor;

wherein the user plane network element is configured to execute the executable program codes to implement:

receiving control indication information transmitted by a session management network element, the control indication information instructing a user plane network element to add application data unit information to header information of a downlink data packet in a service data flow; and transmitting a downlink data packet to an access network device, header information of the downlink data packet including application data unit information indicating an application data unit to which the downlink data packet belongs, the application data unit information being used by the access network device to determine a transmission resource;

wherein the application data unit information comprises at least one of:

a level of the application data unit to which the downlink data packet belongs, the level of the application data unit indicating an importance of the application data unit;

a size of the application data unit to which the downlink data packet belongs;

indication information of an end data packet in the application data unit to which the downlink data packet belongs; or sequence number information of the downlink data packet in the application data unit to which the downlink data packet belongs.

8. The user plane network element according to claim 7, wherein the user plane network element is further configured to implement:

receiving an application layer coding format transmitted by the session management network element, the application layer coding format being a coding format of an application data unit in the service data flow; and parsing downlink data packets in the application data unit according to the application layer coding format.

9. The user plane network element according to claim 7, wherein the user plane network element is further configured to implement:

obtaining the downlink data packet in the service data flow; and adding the application data unit information of the downlink data packet to the header information of the downlink data packet.

10. The user plane network element according to claim 9, wherein the user plane network element is further configured to implement:

identifying application data unit information included in application layer information of the downlink data packet; and adding the application data unit information of the downlink data packet to the header information of the downlink data packet.

11. The user plane network element according to claim 7, wherein the service data flow includes a plurality of application data units, and each application data unit indicates a video frame in a video data stream or a coded segment in a video frame.

12. The user plane network element according to claim 7, wherein the application data unit information further comprises at least one of:

identification information of an application data unit to which the downlink data packet belongs;

indication information of the downlink data packet, data packets with same indication information belonging to a same application data unit; and a type of an application data unit to which the downlink data packet belongs.

13. A session management network element, comprising a processor, a transceiver coupled to the processor, and a memory storing program codes executable by the processor;

wherein the session management network element is configured to execute the executable program codes to implement:

transmitting control indication information, the control indication information instructing an access network device to perform transmission control at an application data unit level, and/or a user plane network element to add application data unit information to header information of a downlink data packet in a service data flow;

wherein the application data unit information being used by the access network device to determine a transmission resource; and the application data unit information comprises at least one of:

a level of the application data unit to which the downlink data packet belongs, the level of the application data unit indicating an importance of the application data unit;

a size of the application data unit to which the downlink data packet belongs;

indication information of an end data packet in the application data unit to which the downlink data packet belongs; or sequence number information of the downlink data packet in the application data unit to which the downlink data packet belongs.

14. The session management network element according to claim 13, wherein the session management network element is further configured to implement:

transmitting an application layer coding format to the user plane network element, the application layer coding format being a coding format of an application data unit in the service data flow, wherein the application layer coding format being used by the user plane network element to parse downlink data packets in the application data unit.

15. The session management network element according to claim 13, wherein the session management network element is further configured to implement:

transmitting the downlink data packet in the service data flow to the user plane network element.

16. The session management network element according to claim 13, wherein the service data flow includes a plurality of application data units, and each application data unit indicates a video frame in a video data stream or a coded segment in a video frame.

17. The session management network element according to claim 13, wherein the application data unit information further comprises at least one of:

identification information of an application data unit to which the downlink data packet belongs;

indication information of the downlink data packet, data packets with same indication information belonging to a same application data unit; and a type of an application data unit to which the downlink data packet belongs.

* * * * *